Oct. 26, 1937.  G. H. SELF  2,096,766

POTATO HILLER

Filed May 21, 1936

G. H. Self.
INVENTOR

BY Victor J. Evans & Co.
ATTORNEYS

Patented Oct. 26, 1937

2,096,766

UNITED STATES PATENT OFFICE 2,096,766

POTATO HILLER

Grafton H. Self, Twin Falls, Idaho

Application May 21, 1936, Serial No. 81,072

7 Claims. (Cl. 97—129)

This invention relates to potato hillers, and more particularly to a plow share adapted for operation between rows of potatoes and has for the primary object the provision of a device which will remove earth from the center of rows of potatoes and direct the dirt onto the rows and pack the dirt so as to thoroughly hill the potatoes to protect them against sunburn and frost and leave the space between the rows free of loose dirt whereby irrigating water may freely flow between the rows without carrying with it loose dirt permitting irrigation to be successfully carried out with less water and with uniform irrigation over a large area.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating a potato hiller constructed in accordance with my invention.

Figure 1:
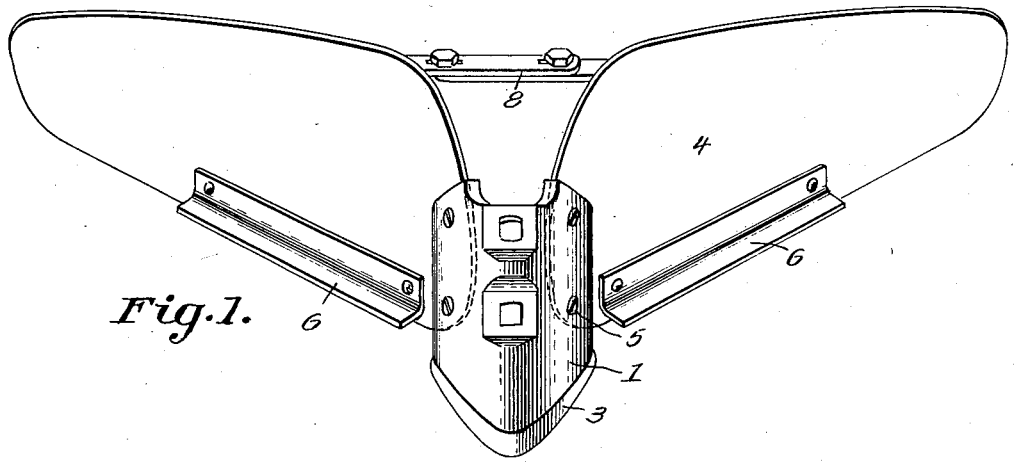
Figure 2:
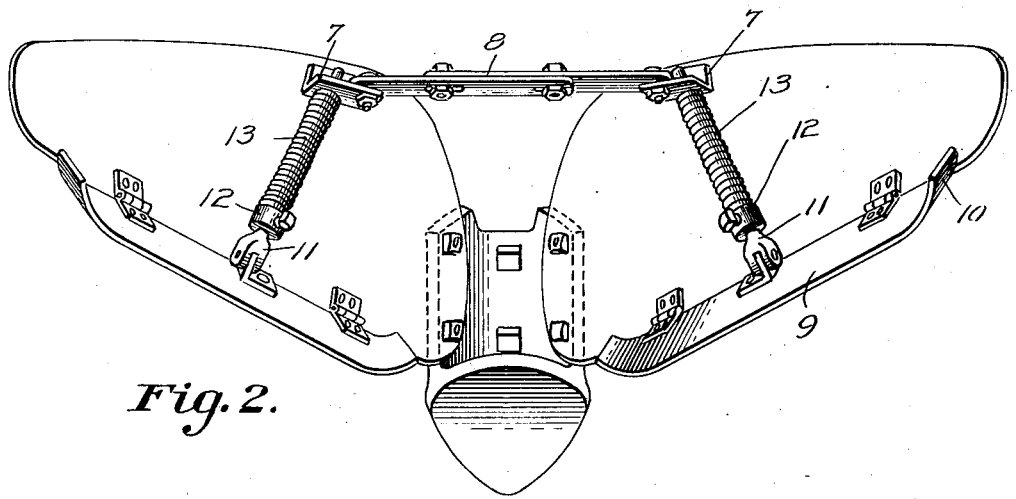
Figure 2 is a rear elevation illustrating the same.
Figure 3:
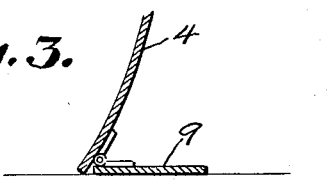
Figure 3 is a detail sectional view illustrating one of the dirt packing plates and its connection to one of the wings of the share.

Referring in detail to the drawing, the numeral 1 indicates a share which may be mounted as usual to a plow construction (not shown) and the share is equipped with a point 2 and cutting edges 3 so that the share will readily pass into the earth and plow the earth for distribution at each side of the share. Secured to and extending laterally from each side of the share are wings 4. Bolts 5 are employed in connecting the wings to the share. The earth plowed by the share is caught by the wings and directed laterally in opposite directions. Secured to the front faces of the wings 4 and adjacent the lower ends thereof are blades 6. The blades have cutting edges, the purpose of which is to cut growth.

Secured to the rear faces of the wings adjacent to their upper edges are brackets 7 and connecting said brackets is an adjustable brace 8, the length of which may be varied for the purpose of adjusting the blades relative to the share so that the device may be employed for cultivating rows of potatoes varying in distances apart. In order to adjust the wings the bolts 5 are loosened.

Hinged to the rear faces of the wings 4 adjacent their lower edges are packing plates 9, the ends of which are curved, as shown at 10. Pivoted to the packing plates 9 are rods 11 which extend through apertures in the brackets 7. Collars 12 are adjustably secured to the rods and interposed between said collars and brackets 7 are coil springs 13. The springs 13 exert force upon the packing plates so that earth coming in contact and passing under the plates 9 will be packed.

In operation, the share 1 operates in the earth at the center of rows of potatoes and the earth loosened by the share is directed onto the rows of potatoes by the wings. The loosened earth when deposited onto the rows of potatoes is packed by the plates 9 thoroughly hilling the potatoes to protect them against sunburn and frost. The wings carrying the loosened earth or dirt to the rows of potatoes leaves the space between the rows free of loose dirt so that irrigated water may pass freely between the rows permitting irrigation to be more successfully and quickly carried out with less consumption of water.

Having described the invention, I claim:

1. A potato hiller comprising a share provided with a point and cutting edges, wings extending laterally from the share in opposite directions, means connecting said wings, and earth packing means carried by and extending longitudinally of said wings.

2. A potato hiller comprising a share provided with a point and cutting edges, wings extending laterally from the share in opposite directions, means connecting said wings, packing plates hinged to said wings and extending longitudinally of the lower edge thereof, and spring means acting on said packing plates.

3. A potato hiller comprising a share, wings secured to the share and extending outwardly and rearwardly therefrom, cutters carried by said wings on the forward side thereof for severing vegetation, adjusting means connecting said wings, packing plates hinged to the lower edges of said wings and having the ends upwardly curved, and spring means acting on said plates.

4. A potato hiller comprising a share provided with substantially parallel rearwardly extending portions, laterally extending wings secured to said parallel portions, a packing member for each wing, and means hingedly securing each member to the lower edge of each wing.

5. A potato hiller comprising a share, laterally extending wings secured to said share, a packing member extending longitudinally of the lower edge of each wing, means hingedly securing each member to the lower edge of a wing, and spring pressed means engaging the wings and the packing members constantly urging said packing members downwardly.

6. A potato hiller comprising a share, laterally extending wings secured to said share, a packing member extending longitudinally of the lower edge of each wing, means hingedly securing each member to the lower edge of a wing, a bracket carried by each wing on the under or rear side thereof, a bar pivotally secured at one end to a packing member and slidably engaging a bracket, and a spring about said bar constantly urging said packing member downwardly.

7. A potato hiller comprising a share, laterally extending wings secured to said share, a packing member extending longitudinally of the lower edge of each wing, means hingedly securing each member to the lower edge of a wing, a bracket carried by each wing on the under or rear side thereof, a bar pivotally secured at one end to a packing member and slidably engaging a bracket, a spring about said bar constantly urging said packing member downwardly, and an extensible member connecting the brackets together.

GRAFTON H. SELF.